3,753,938
THERMOPLASTIC SHEET MATERIAL

Raymond Montague Edwards, 31 Mount Pleasant Road, Chigwell, and Patrick Joseph Tierney, 34 Gloucester Road, New Barnet, England
No Drawing. Continuation-in-part of application Ser. No. 191,832, Oct. 22, 1971, which is a continuation-in-part of abandoned application Ser. No. 6,597, Jan. 28, 1970. This application Apr. 18, 1972, Ser. No. 245,259
Int. Cl. C08f 45/52
U.S. Cl. 260—28.5 D                  17 Claims

ABSTRACT OF THE DISCLOSURE

A flexible waterproof sheet material is made by forming a uniform mixture of calenderable consistency containing hard bitumen of softening point at least 70° C., a compatible synthetic elastomer which constitutes a maximum of 50% by weight of the mixture, and non-fibrous and fibrous reinforcing filler, and calendering the mixture to form a sheet of uniform composition.

CROSS-REFERENCE TO RELATED APPLICATION

This application is a continuation-in-part of our application Ser. No. 191,832, filed Oct. 22, 1971, which in turn is a continuation-in-part of our application Ser. No. 6,597, filed Jan. 28, 1970, now abandoned.

The present invention relates to a preformed flexible thermoplastic waterproof sheet material and to its production, the material being of high tensile and tear strength. The sheet material according to the invention is suitable for use in building operations where waterproof membranes are required such as on roofs. It is particularly suitable for use as a damp-course material where a high degree of resistance to sliding is required in brickwork joints containing a damp-proof membrane.

In the production of the waterproof sheet material of the invention synthetic elastomeric material compatible with bituminous materials is combined with hard bitumen together with fibrous and nonfibrous reinforcing filling materials, the elastomeric material being present up to a maximum of 50% by weight of the final material.

Suitable synthetic elastomeric materials include mixtures of chlorosulphonated polyethylene with chlorinated polyethylene or chlorinated rubber preferably with a plasticiser such as chlorinated paraffin.

The synthetic elastomeric material is one which consists of or includes chlorosulphonated polyethylene. Where chlorosulphonated polyethylene is employed in admixture with one or more other synthetic elastomers it constitutes at least 50 wt. percent, e.g. about 55 to 75 wt. percent of the total amount of synthetic elastomeric material. It is to be understood that references herein to synthetic elastomeric material do not include any of the fibrous or non-fibrous filler which might be elastomeric.

Chlorosulphonated polyethylene may for example be employed in admixture with one or more of a polyvinyl chloride, vinylidene halide copolymer, atactic polypropylene, styrene-butadiene block copolymers, chlorinated rubber, chlorinated polyethylene, polyethylene, and ethylene copolymer (e.g. ethylene-propylene copolymer, ethylene-propylene-diene terpolymer, ethylene-vinyl acetate copolymer, butyl rubber-polyethylene graft copolymer).

A suitable chlorosulphonated polyethylene is that available under the trademark "Hypalon"; the preferred grades for use in this invention have a chlorine content of from 25 to 45 wt. percent and a Mooney viscosity of 35 to 80, though these values are not to be regarded as limiting. The preferred vinylidene halide copolymers are those of vinylidene chloride with acrylonitrile, the acrylonitrile usually constituting 10 to 20 wt. percent of the copolymer. The ethylene-vinyl acetate copolymers preferably contain 15 to 35 wt. percent of vinyl acetate, most preferably at least 18 wt. percent e.g. about 25 wt. percent. Other ethylene copolymers which may be used in combination with chlorosulphonated polyethylene include copolymers with other unsaturated hydrocarbons e.g. ethylene-propylene copolymers and terpolymers such as ethylene-propylene-diene copolymers; a suitable such terpolymer is one of ethylene, propylene and 1,3-butadiene containing up to 5 wt. percent of the diene. Suitable butyl rubber-polyethylene graft copolymers for use in the synthetic elastomeric material include those containing from 25 to 60 wt. percent butyl rubber. High density polyethylene (e.g. density 0.95, melt flow index 0.4) and/or low density polyethylene (e.g. density 0.92, melt flow index 1.0) may be used in the synthetic elastomeric material. Amongst suitable block copolymers for use in conjunction with chlorosulphonated polyethylene are polystyrene-polybutadiene-polystyrene copolymers in which the terminal polystyrene blocks preferably have molecular weights of from 7,000 to 100,000, e.g. 10,000 to 50,000 and the central block a molecular weight of at least 25,000, e.g. from 30,000 or 40,000 to about 150,000; the terminal blocks suitably constitute up to 70 wt. percent, e.g. 20 to 50 wt. percent of the copolymer.

As previously indicated, the synthetic elastomeric material consists wholly or predominantly of chlorosulphonated polyethylene, the sheet in these cases having good resistance to ageing and deterioration of properties on weathering and in particular on exposure to heat and exposure to ozone. The incorporation of one or more of polyvinylchloride, vinylidene halide copolymer, chlorinated rubber and chlorinated polyethylene can improve the inherent fire resistance of the product so as to reduce or eliminate the need for incorporation of a specific fire retardant. The inclusion of the styrene-butadiene block copolymers with the chlorosulphonated polyethylene can improve the toughness of the final product, and the inclusion of atactic polypropylene, a generally waxy material having good compatibility with the bitumen, can improve the processability of the composition (i.e. in the formation of the mix and calendering it to a sheet), thus enabling greater through-put in production of the sheet.

The use of ethylene-vinyl acetate copolymer in the synthetic elastomer material improves impact resistance of the product at low or ambient temperatures, and the butyl rubber-polyethylene graft copolymers have a similar affect. The use of polyethylene and the various other ethylene copolymers mentioned above (e.g. the ethylene/propylene copolymers and the ethylene/propylene/diene terpolymers) can enhance the processability of the composition, and the toughness of the sheet product.

The fibrous material may be selected from filaments of glass, and synthetic thermoplastic (e.g. polyester), inorganic mineral, animal and vegetable fibres, and in some cases the bitumen and fibre may be derived wholly or in part from scrap bitumen impregnated fibre-based roofing felts of known kinds.

It is most preferred for the fibrous reinforcement filler to consist of or include synthetic thermoplastic fibre, which may for example be selected from polyester, nylon, acrylic, cellulose acetate, polypropylene, rayon and polyvinyl chloride fibre. Polyester fibre preferably constitutes at least part of the synthetic thermoplastic fibre component employed. Mineral, glass animal or vegetable fibre may be included.

Fire resistance of the product may be improved by incoporating an agent such as antimony sulphide or oxide; chlorinated paraffins may be incorporated as fire retardants, and can serve also as plasticisers for the elastomeric material. The incorporation of fire retardant is of importance in the production of roofing grades of the sheet material except in some instances where one or more of polyvinyl chloride, vinylidene halide copolymer, chlorinated rubber and chlorinated polyethylene are employed in admixture with chlorosulphonated polyethylene as the elastomer component. The more highly chlorinated paraffins impart greater fire resistance than the less chlorinated compounds, but have less lubricating or plasticising effect; a mixture of highly (e.g. 70%) and less (e.g. 50%) chlorinated paraffin may be used with advantage to act both as plasticiser and fire retardant.

Further materials in powder or fibre form may also be included as extenders and such a composition is suitable to be calendered to convert it to sheet form.

As examples of the nonfibrous reinforcing filler materials there may be mentioned carbon black, silica, polyester resin and calcium carbonate.

In forming the sheet, the ingredients are formed into a uniform mixture of calenderable consistency, which is calendered into sheet form. The product thus comprises a matrix of hard bitumen and synthetic elastomer through which the fibrous and nonfibrous fillers are uniformly dispersed. To ensure calenderable consistency, the mixture should contain at least 10 or 12% by weight of the synthetic elastomer and no more than 30% by weight, most preferably 5 or 6 to 30% by weight of hard bitumen. The most preferred proportions are 15 to 30 wt. percent or about 19 to 26% by weight synthetic elastomer and about 20 to 25% by weight hard bitumen, as in the following examples. To the same end the fibrous filler preferably comprises no more than 15% e.g. 2 to 10% by weight of the mixture.

The sheet material according to the invention can with advantage be laminated to a supporting or backing web or layer. Suitable substrates for lamination to sheet according to the invention include metal (e.g. aluminium) sheet or foil, cork sheet, asbestos sheet, and plastics (e.g. polypropylene) mesh. The substrate is normally heat-sealed to the thermoplastic sheet according to the invention, but where it is an aluminium or other metal sheet or foil it may be preferred to use an adhesive, e.g. a conventional bituminous heat-sensitive adhesive. Such laminates find use as flashing materials, as expansion joints and as waterproof covers for expansion joints.

The following are specific examples of sheet materials according to the invention and of their preparation.

Example 1

A first mix is prepared of 30 parts by weight of chlorosulphonated polyethylene and 10 parts by weight of chlorinated rubber to which is added 5 parts by weight of chlorinated paraffin as a plasticiser.

To this mix is added 35 parts by weight of hard bitumen together with nonfibrous reinforcing material consisting of 50 parts by weight of precipitated calcium carbonate and 14 parts by weight of carbon black, and fibrous material consisting of 10 parts by weight of polyester fibre.

The mixing is carried out either by means of a double roll mill or a Banbury type mixer, and the mix is then calendered to form a sheet. In the calendering of the sheet it is desirable that a slightly veined and roughened surface is achieved in order to give better adhesion to brickwork mortar.

Example 2

A first mix is prepared of 15 parts by weight of chlorosulphonated polyethylene and 12 parts by weight of chlorinated polyethylene to which is added 15 parts by weight of chlorinated paraffin as a plasticiser.

To this mix is added 35 parts by weight of hard bitumen together with nonfibrous reinforcing material consisting of 30 parts by weight of precipitated calcium carbonate and 30 parts by weight of carbon black, and fibrous material consisting of 8 parts by weight of polyester fibre. A sufficient quantity of antimony sulphide may also be incorporated to give improved fire resistance.

The mix is formed and calendered into a sheet as described in Example 1.

Example 3

A first mix is prepared of 35 parts by weight of chloro sulphonated polyethylene and 5 parts by weight of chlorinated paraffin, the latter being a 50/50 mixture of 70% and 50% chlorinated paraffin.

To this mix is added 35 parts by weight of hard bitumen material together with non-fibrous filler consisting of 50 parts by weight of precipitated calcium carbonate and 14 parts by weight of carbon black, and reinforcing fibrous filler consisting of 10 parts by weight of polyester fibre.

By "hard bitumen" in the examples and elsewhere herein is to be understood bitumen having a softening point of 70° C. or above (ring and ball method).

The mixing is carried out either by means of a double roll mill or a Banbury type mixer, and the mix is then calendered to form a sheet. In the calendering of the sheet it may be desirable that a slightly veined and roughened surface is achieved in order to give better adhesion to brickwork mortar.

Example 4

A first mix is prepared of 25 parts by weight of chlorosulphonated polyethylene and 12 parts by weight of chlorinated paraffin as in Example 3.

To this mix is added 35 parts by weight of hard bitumen together with non-fibrous filler consisting of 30 parts by weight of precipitated calcium carbonate and 30 parts by weight of carbon black, and reinforcing fibrous filler consisting of 8 parts by weight of polyester fibre. A sufficient quantity of antimony sulphide may also be incorporated to give improved fire resistance.

The mix is formed and calendered into a sheet as described in Example 3.

Example 5

Example 3 is repeated employing, instead of the 35 parts by weight of chlorosulphonated polyethylene, 30 parts by weight of chlorosulphonated polyethylene and 10 parts by weight of atactic polypropylene wax.

Examples 6 and 7

Example 5 is repeated with the atactic polypropylene wax replaced by (a) 10 parts by weight of polyvinyl chloride (Example 6) and (b) 10 parts by weight of a 90:10 (wt. percent) vinylidene chloride-acrylonitrile copolymer, the chlorinated paraffin in each case consisting wholly of the 50% chlorinated compound.

Example 8

Example 5 is repeated with the atactic polypropylene replaced by 10 parts by weight of butyl rubber-polyethylene copolymer containing 30 wt. percent of butyl rubber.

Example 9

Example 5 is repeated using as the synthetic elastomeric material 30 parts by weight of chlorosulphonated polyethylene, 6 parts by weight of a polystyrene-polybutadiene-polystyrene block copolymer of molecular weight about 150,000 and containing about 40 wt. percent polystyrene, and 5 wt. percent of atactic polypropylene.

Example 10

Example 1 is repeated with the chlorinated rubber replaced by 10 parts by weight of ethylene-vinyl acetate copolymer (about 25 wt. percent vinyl acetate content), the chlorinated paraffin being the 50% chlorinated material acting mainly as a plasticiser. Where greater fire resistance is required in the product a 50/50 mixture of 70% and 50% chlorinated paraffin can be used instead as in Example 3.

Example 11

Example 2 is repeated with the chlorinated polyethylene replaced by 12 parts by weight of ethylene-vinyl acetate copolymer (about 25 wt. percent vinyl acetate content), the chlorinated paraffin being the 50% chlorinated material acting mainly as a plasticiser. Where greater fire resistance is required in the product a 50/50 mixture of 70% and 50% chlorinated paraffin can be used instead as in Example 3.

Where coloured sheets are to be formed, the use of carbon black in the non-fibrous filler is avoided, and one or more pigments are included in the mix, in addition, if an antimony compound is to be included as a fire retardant than the oxide will be selected rather than the black sulphide. All of the above examples employ polyester fibre as the reinforcing fibrous filler, this is preferred, but in each example the polyester fibre can be replaced wholly or partially by one or more of polypropylene, rayon, acrylic, acetate, polyvinyl chloride and nylon fibre.

The preferred sheets according to the invention are those which contain about 20 to 25 wt. percent hard bitumen, about 19 to 26 wt. percent synthetic elastomeric material and up to 10 wt. percent, e.g. 5 to 7 or 8 wt. percent synthetic thermoplastic fibre, and in which the synthetic elastomeric material consists of chlorosulphonated polyethylene alone or contains a predominant amount (e.g. about 55 to 75 wt. percent) of chlorosulphonated polyethylene together with other synthetic elastomer such as chlorinated polyethylene or ethylenevinyl acetate copolymer.

What is claimed is:

1. A preformed waterproof sheet consisting essentially of a uniform mixture of hard bitumen, synthetic elastomeric material compatible therewith and fibrous and non-fibrous reinforcement filling materials, the hard bitumen having a softening point of at least 70° C. and comprising from 5 to 30% by weight of the mixture, said synthetic elastomeric material constituting from 10 to 50% by weight of the mixture, and at least 50 wt. percent of said synthetic elastomeric material being chlorosulphonated polyethylene.

2. A sheet as claimed in claim 1, wherein the synthetic elastomeric material comprises about 19% to 26% by weight of the mixture and the hard bitumen comprises about 20% to 25% by weight of the mixture.

3. A sheet as claimed in claim 1, wherein said fibrous filling material comprises from about 2 to 15% by weight of the mixture.

4. A sheet as claimed in claim 1, wherein said synthetic elastomeric material constitutes from 15 to 30 wt. percent of the mixture.

5. A sheet as claimed in claim 1, wherein said synthetic elastomeric material comprises in addition to the chlorosulphonated polyethylene at least one hard bitumen-compatible synthetic elastomer selected from the group consisting of ethylene homopolymers and copolymers, chlorinated rubber, chlorinated polyethylene, polyvinyl chloride, vinylidene halide copolymer, atactic polypropylene, and styrene-butadiene block copolymer.

6. A sheet as claimed in claim 1, wherein chlorosulphonated polyethylene constitutes about 55 to 75 wt. percent of said synthetic elastomeric material.

7. A sheet as claimed in claim 1, wherein said synthetic elastomeric material consists essentially of a mixture of chlorosulphonated polyethylene and ethylene-vinyl acetate copolymer in a weight ratio of from about 3:1 to about 5:4.

8. A sheet as claimed in claim 1, wherein said fibrous filling material is synthetic thermoplastic fibre.

9. A sheet as claimed in claim 8, wherein said synthetic thermoplastic fibre is selected from the group consisting of polyester, nylon, acrylic, cellulose acetate, rayon, polypropylene and polyvinyl chloride fibre.

10. A sheet as claimed in claim 1, laminated to a backing layer selected from the group consisting of metal sheets and foils, cork sheet, asbestos sheet and polypropylene mesh.

11. A sheet as claimed in claim 2, wherein said synthetic elastomeric material comprises a mixture of chlorosulphonated polyethylene and chlorinated polyethylene.

12. A sheet as claimed in claim 1, wherein the fibrous material comprises at least one of the group consisting of glass filaments, animal, vegetable, inorganic mineral and synthetic thermoplastic fibers and the non-fibrous material comprises at least one of the group consisting of carbon black, silica, polyester resin and calcium carbonate.

13. A method of producing a self-supporting flexible waterproof sheet material, comprising: forming a homogeneous mixture of calenderable consistency comprising hard bitumen, synthetic elastomeric material compatible with the hard bitumen, and fibrous and non-fibrous reinforcement filling materials, the synthetic elastomeric material constituting from 10% to 50% by weight of the mixture and comprising at least 50% by weight of chlorosulphonated polyethylene; said hard bitumen having a softening point of at least 70° C. and constituting from 5% to 30% by weight of the mixture; and calendering said mixture to form a self-supporting sheet.

14. A method as claimed in claim 13, wherein the synthetic elastomeric material comprises about 19% to 26% by weight of the mixture and the hard bitumen comprises about 20% to 25% of the mixture.

15. A method as claimed in claim 13, wherein said calendering causes the sheet to have a roughened surface.

16. A method as claimed in claim 14, wherein said hard bitumen constitutes about 20 to 25 wt. percent of said mixture, and said synthetic elastomeric material constitutes about 19 to 26 wt. percent of said mixture and contains about 55 to 75 wt. percent chlorosulphonated polyethylene.

17. A method as claimed in claim 13, including the further step of laminating said flexible sheet to a backing web.

References Cited
UNITED STATES PATENTS

| | | | |
|---|---|---|---|
| 3,345,316 | 10/1967 | Nielsen | 260—28.5 AS |
| 2,464,219 | 3/1949 | Doyle | 260—28.5 D |
| 3,673,141 | 6/1972 | Trieschmann | 260—28.5 AS |
| 2,688,005 | 8/1954 | Clayton | 260—28.5 AS |
| 2,880,127 | 3/1959 | Spokes | 260—28.5 B |
| 3,635,864 | 1/1972 | McCarthy | 260—28.5 AS |
| 3,111,787 | 11/1963 | Chamberlain | 260—28.5 B |
| 2,752,316 | 6/1956 | Bolt | 260—28.5 D |

ALLAN LIEBERMAN, Primary Examiner

P. R. MICHL, Assistant Examiner

U.S. Cl. X.R.

260—28.5 AS; 161—236, 224